United States Patent
Himmelsbach et al.

(10) Patent No.: US 9,477,933 B2
(45) Date of Patent: Oct. 25, 2016

(54) SYSTEM AND METHOD FOR GRAPHICAL REPRESENTATION OF BUSINESS DOCUMENTS AND EFFECTIVITY

(75) Inventors: Gerhard Himmelsbach, Mannheim (DE); Claus Kollmannsperger, Reilingen (DE)

(73) Assignee: SAP SE, Walldorf (DE)

( * ) Notice: Subject to any disclaimer, the term of this patent is extended or adjusted under 35 U.S.C. 154(b) by 1158 days.

(21) Appl. No.: 12/578,438

(22) Filed: Oct. 13, 2009

(65) Prior Publication Data

US 2011/0087986 A1 Apr. 14, 2011

(51) Int. Cl.

| | | |
|---|---|---|
| G06F 3/048 | (2013.01) | |
| G06Q 10/00 | (2012.01) | |
| G06Q 10/06 | (2012.01) | |
| G06T 11/20 | (2006.01) | |
| G06T 11/40 | (2006.01) | |
| G06Q 10/08 | (2012.01) | |

(52) U.S. Cl.
CPC .......... *G06Q 10/06* (2013.01); *G06Q 10/0875* (2013.01); *G06Q 10/063* (2013.01); *G06Q 10/06375* (2013.01); *G06Q 10/087* (2013.01); *G06T 11/203* (2013.01); *G06T 11/206* (2013.01); *G06T 11/40* (2013.01)

(58) Field of Classification Search
CPC ..... G06T 11/40; G06T 11/206; G06T 11/203
USPC .................................................. 345/440–442
See application file for complete search history.

(56) References Cited

U.S. PATENT DOCUMENTS

| | | | | |
|---|---|---|---|---|
| 6,707,454 | B1 * | 3/2004 | Barg et al. .................... | 345/440 |
| 7,015,912 | B2 * | 3/2006 | Marais ........................ | 345/440.2 |
| 7,471,293 | B2 * | 12/2008 | Clymer et al. ............... | 345/440 |
| 7,800,613 | B2 * | 9/2010 | Hanrahan et al. ............ | 345/440 |
| 2003/0014287 | A1 * | 1/2003 | Williams et al. ............. | 705/7 |
| 2004/0128120 | A1 * | 7/2004 | Coburn et al. ................ | 703/26 |
| 2004/0135782 | A1 * | 7/2004 | Marais ......................... | 345/440 |
| 2005/0265083 | A1 * | 12/2005 | Perry .......................... | 365/189.01 |
| 2007/0126736 | A1 * | 6/2007 | Tolle et al. ................... | 345/440 |
| 2007/0219656 | A1 * | 9/2007 | Rothenburg ................. | 700/97 |

* cited by examiner

*Primary Examiner* — Jin-Cheng Wang

(57) ABSTRACT

A system and method to graphically represent historical product structures. When a computer extracts all change states for a data set corresponding to a first product structure having a plurality of items. The change states associated with each item are concatenated. The concatenated change states relative to each item and to the parametric constraint effective for the data set are displayed on an electronic display. In this way it is possible to visualize the historical product structure.

16 Claims, 3 Drawing Sheets

SYSTEM AND METHOD FOR GRAPHICAL REPRESENTATION OF BUSINESS DOCUMENTS AND EFFECTIVITY

BACKGROUND OF THE INVENTION

1. Field

The invention relates to graphical representation of product structures subject to effectivity constraints. More specifically, the invention relates to graphical representation of product structures subject to validity constraints.

2. Background

To support traceability and preserve history of an iterative development, all changes need to be captured. This is equally true for product development. Commonly, these changes are captured as change states. As used herein, "change states" are the smallest, i.e., most granular, atom of history. Traditionally, they have been distinguished from one another by a change number, which is unique for each iteration. Commonly, a subsequent iteration of a change state is created as a copy of the predecessor with one or more attribute fields changed. The unique change number indicates the new change state and assigns an effectivity. Herein, "effectivity" is used synonymously with validity.

Effectivity can be, for example, date effectivity or parameter effectivity. The effectivity is typically stored in a change master. Accordingly, the change master retains the effectivity globally for all related change states. With respect to date effectivity, it is commonly represented as an open interval, e.g., a valid from date. Date effectivity is typically closed by the creation of a subsequent change state with a subsequent valid from date. With parameter effectivity, it is possible to have a single value, a closed interval (a start and end value) or an open interval, which merely has a starting value. Again, open intervals are deemed closed by a subsequent change state having its own effectivity interval.

Historically, viewing of the change states required selection of the effectivity parameter value for which viewing was desired. The change states effective at that value would then be returned to the user for viewing. Thus, what was returned was merely a snapshot of the product structure consistent with the selected parameter value. This fails to provide a historical context of changes in the product structure.

SUMMARY

A system and method to graphically represent historical product structure is disclosed. When a computer extracts all change states for a first product structure having a plurality of items. The change states associated with each item are concatenated. The concatenated change states relative to each item and to the parametric constraint effective for the data set are displayed on an electronic display. In this way it is possible to visualize the historical product structure.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
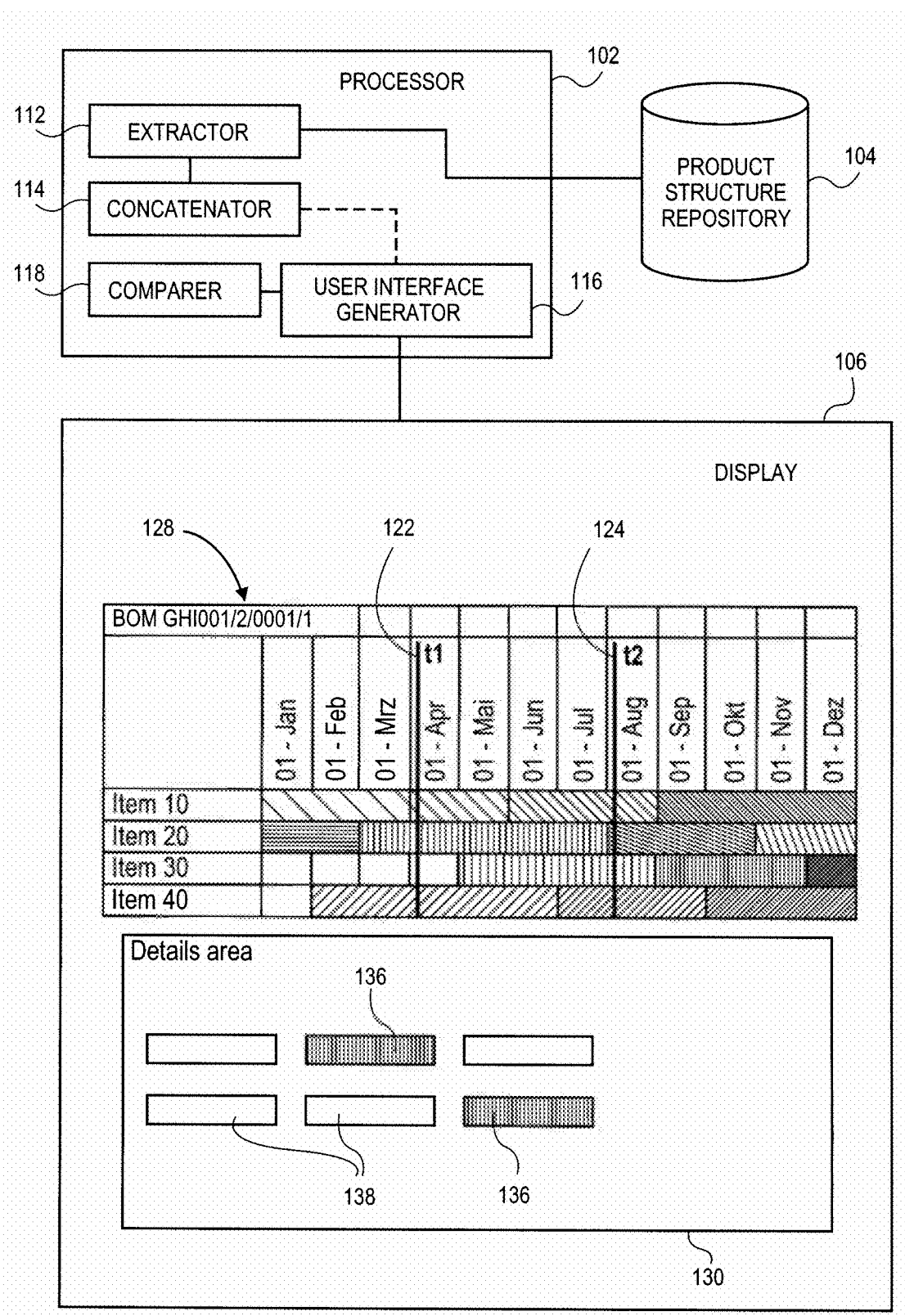
FIG. 1 is a block diagram of a system of one embodiment of the invention.

FIG. 1 is a block diagram of a system of one embodiment of the invention. A processor 102 is coupled to a product structure repository 104 and display 106. User interface (UI) generator 116 executing on processor 102 generates a graphical user interface (GUI) on display 106. The GUI permits a user to select one or more product structures for review. In some embodiments, the product structure may be reflected in a business document such as a bill of materials (BOM). When a product structure is selected, extractor 112 retreives all the change states associated with the product structure from product structure repository 104. Concatenator 114 then concatenates the change states on a per-line item basis in association with the product structure. The concatenated change states are passed to UI generator 116 which generates a graphical display representation of the product structure relative to the effitivity parameter. One such representation is the representation of a Bill of Materials (BOM) 128 shown on display 106. In this example, the effectivity parameter date effectivity. However, parameter effectivity such as where serial number serves as the validity constraint could be similarly represented. The different shadings reflect different change states of the different items on the BOM. As shown, there are four change states associated with item 10 and item 20, and three change states associated with each of items 30 and item 40. Notably, item 30 was not even part of the bill of materials until May. Facts such as this which are instantly apparent in the representation shown are not readily discernable from the prior art snap shot approach to representing such validity varying documents.

In some embodiments, UI generator 116 generates graphical elements 122 and 124 which may be used to graphically select dates within the life cycle of a product structure for comparison. In one embodiment, the graphical elements are sliders which may be slid along the validity axis (here, the time axis) to select different effectivity parameter values. When the parameter values are selected using slider 122 and 124, the change states corresponding to those values are then compared by comparer 118 with field differences between the change states of those values then highlighted in a details area 130 as indicated by rectangles 136. As used herein, "highlight" indicates the form of any representation which causes the highlighted material to stand out from other material including, but not limited to, changes in color, font or shading. Rectangles 138 represent the fields that remained constant at both values. This mechanism facilitates rapid comparison and easy graphical representation between dates of interest.

Figure 2:
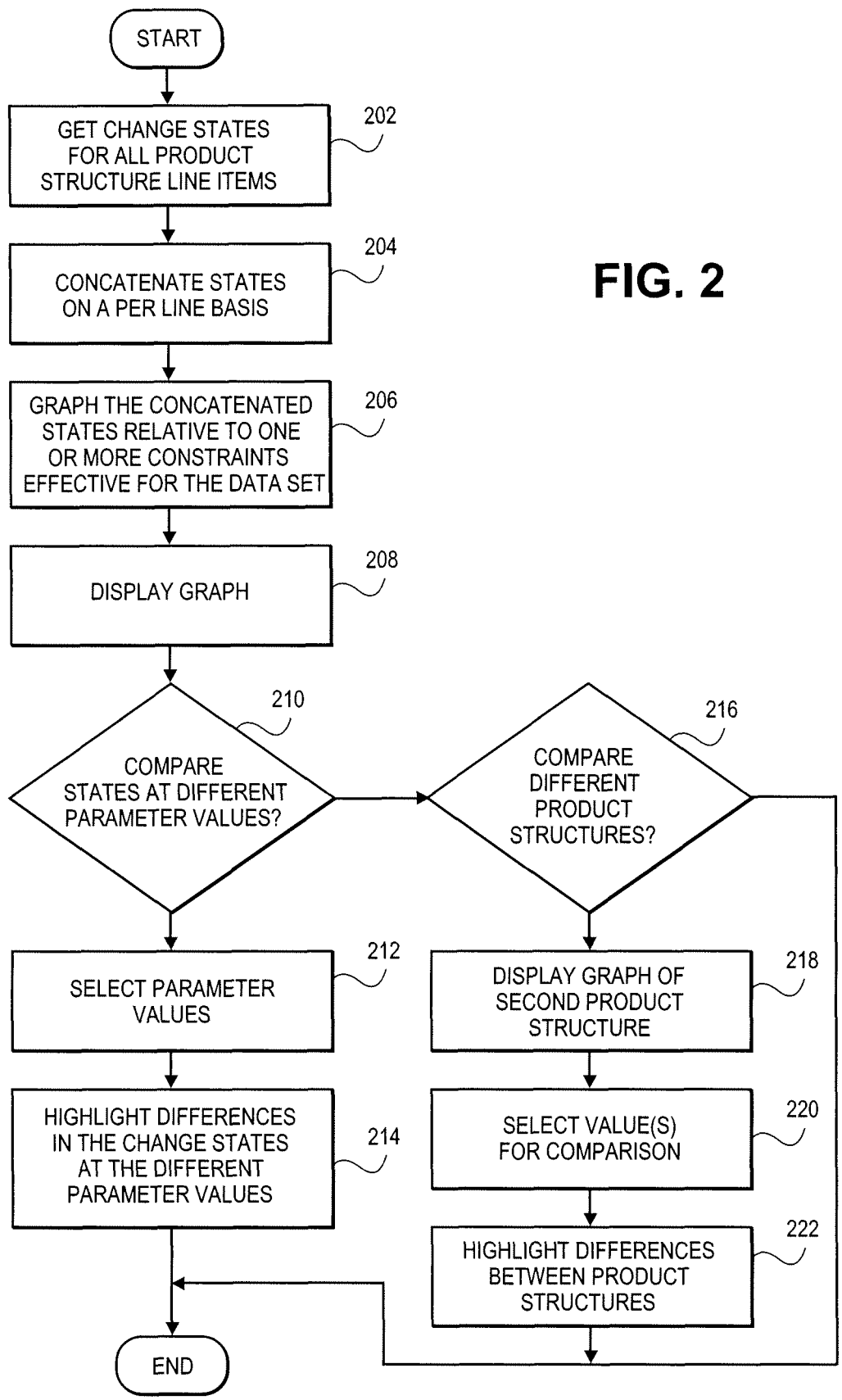
FIG. 2 is a flow diagram of operation in one embodiment of the invention.

FIG. 2 is a flow diagram of operation in one embodiment of the invention. At block 202, change states of all line items of a set of product structures are retrieved from a persistent storage unit. At block 204, change states associated with each line item are concatenated serially. The ordering of concatenation is fairly clear in the context of date effectivity. However, in the context of parameter effectivity, e.g., where serial number represents the validity constraint, the ordering may be less clear. In this context, the process may apply a series of rules to determine a proper ordering of the concatenated change states.

At block 206, the concatenated change states are graphed relative to one or more constraints effective for the data set. For example, as shown in FIG. 1, the change states for the bill of material line items are graphed relative to date. The graph is displayed at block 208. A determination is made at block 210 whether the user desires to compare the change states at different values for the parameter; in the example of FIG. 1, different dates. If comparison is desired, the user selects the parameter values, e.g., dates, at which comparison is desired. At block 214, differences in the change states at the selected values are highlighted for the user.

If at block 210 the user does not wish to compare different parameter values within the same product structure, the determination is made at block 216 if comparison of different product structures is desired. If comparison of different product structures is desired, a graph of a second product structure is displayed at block 218. The graph may be created following the same pattern as described with reference to blocks 202, 204 and 206 above. At block 220, a user selects the values for comparison between the product structures. The value may be the same, for example, comparing a first product structure to a second product structure on January 1, 2009; or different, comparing a first product structure on January 1, 2009 with the second product structure on July 20, 2009, for example. The difference between the product structures at the selected values may be highlighted and displayed at block 222. An example for comparison of two product structures is shown and described with reference to FIG. 3 below.

Figure 3:
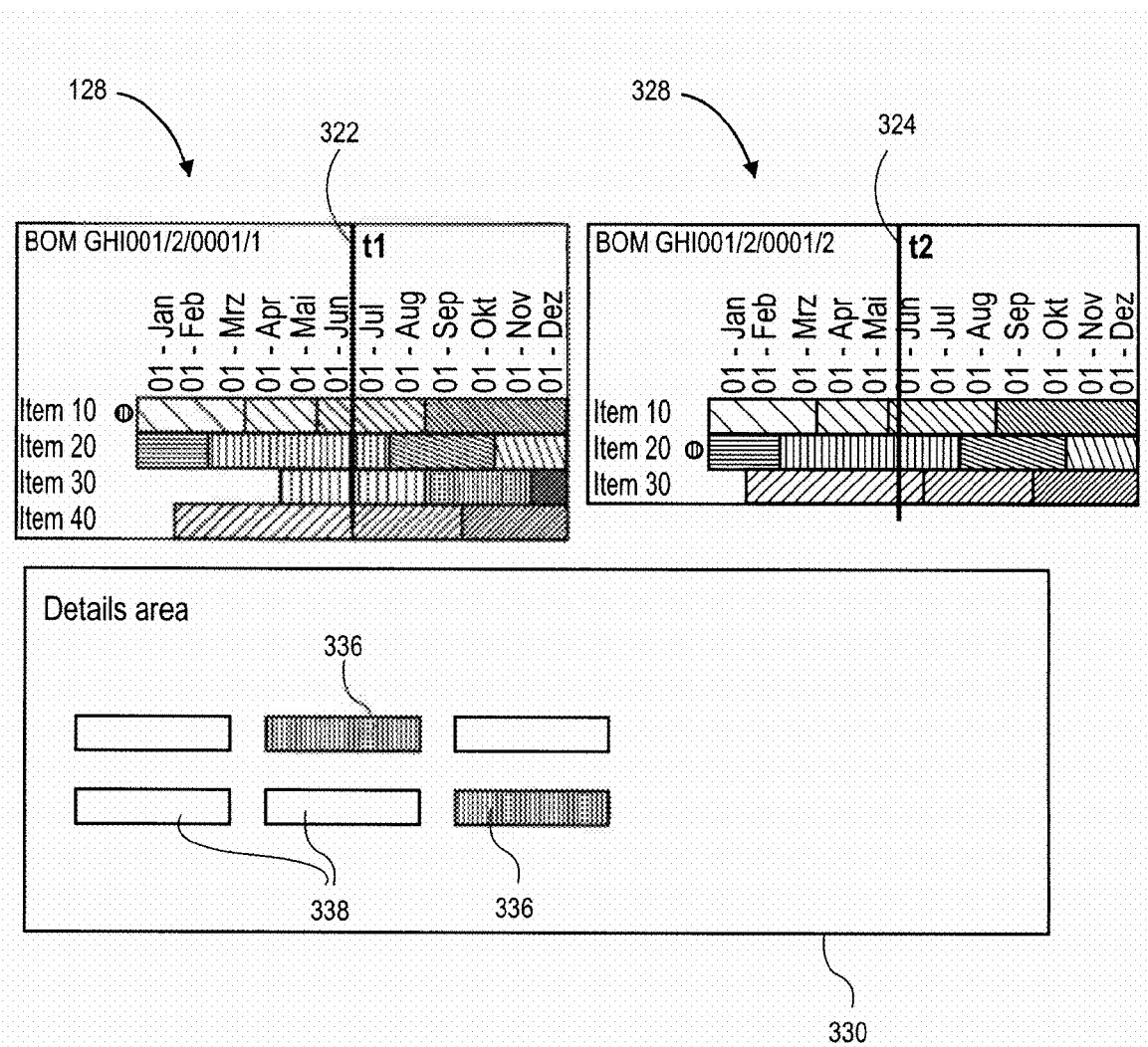
FIG. 3 shows a graphical user interface of the comparison between two different product structures.

FIG. 3 shows a graphical user interface of the comparison between two different product structures. Here, comparison is shown occurring at different data sets between the product structures. In one embodiment, the product structure represented in graph 128 is compared with the product structure represented in graph 328. Slider 322 may be positioned along graph 128 to select a value for comparison. Slider 324 may be moved along graph 328 to select the value within that product structure for comparison. The details area 130 then displays the fields of the change states for the selected values. Fields that are different between the two selected product structures may be highlighted, while the unchanged fields are merely displayed.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    extracting, in a computer, all change states for a first data set corresponding to a first product structure representing the physical structure of a product during one or more effectivity periods, the product structure having a plurality of items each item representing a portion of the physical structure;
    concatenating, in the computer, change states on a per item basis; and
    displaying, on an electronic display, the concatenated change states for each item relative to a parametric constraint effective for the data set.

2. The method of claim 1 further comprising:
    providing a graphical user interface to accept an indication of two values for the parametric constraint; and
    comparing the change states at the two values for the parametric constraint.

3. The method of claim 2 further comprising:
    highlighting, on the electronic display, differences between the change states at the two values.

4. The method of claim 1 further comprising:
    displaying for a second data set corresponding to a second product structure having a plurality of items concatenated change states of each item relative to a parametric constraint effective for the data set.

5. The method of claim 4 further comprising:
    providing a graphical user interface to accept an indication of a value for the parametric constraint; and
    comparing the change states for the two product structures at the value.

6. The method of claim 5 wherein the value is different for the first data set and the second data set.

7. A non-transitory computer readable medium containing instructions that when executed by a processor cause the processor to:
    extract all change states for a first data set corresponding to a first product structure representing the physical structure of a product during one or more effectivity periods, the first product structure having a plurality of items each item representing a portion of the physical structure;
    concatenate change states on a per item basis; and
    display, on an electronic display, the concatenated change states for each item relative to a parametric constraint effective for the data set.

8. The computer readable medium of claim 7 further comprising instructions causing the processor to:
    accept an indication of a two values for the parametric constraint; and
    compare the change states at the two values for the parametric constraint.

9. The computer readable medium of claim 8 further containing instructions causing the processor to:
    highlight, on the electronic display, differences between a set of change states for a same plurality of items at the two values.

10. The computer readable medium of claim 7 further containing instructions causing the processor to:
    display for a second data set corresponding to a second product structure having a plurality of items concatenated change states of each item relative to a parametric constraint effective for the data set.

11. The computer readable medium of claim 7 further containing instructions causing the processor to:
    accept an indication of a value for the parametric constraint;

compare the change states for the two product structures at the value; and highlight fields for which the change states are different at the value.

12. A system comprising:
an extraction engine to obtain a set of change states for a data set corresponding to structure of a first product having a plurality of items each representing a subcomponent that together form the first product;
a concatenator to serially arrange the change states for different values of a parametric constraint effective for the data set on a per item basis; and
a graphics processor to render a graphical representation of a set of the concatenated change states for the first product structure.

13. The system of claim 12 further comprising:
a comparator to identify differences in a set of change states valid at a first value for the parametric constraint and a set of change states valid at a second value of the parametric constraint.

14. The system of claim 13 wherein the graphic processor highlights fields in the data set having differences at the first and second value.

15. The system of claim 12 further comprising:
a comparator to identify differences between changes states valid for the first product structure at a first value of the parametric constraint and change states valid for a second product structure at a second value of the parametric constraint.

16. The system of claim 15 where in the first value is equal to the second value.

\* \* \* \* \*